Feb. 7, 1956 — J. ELSBERG — 2,733,537
SINKER RELEASER FOR FISHING LINES
Filed July 6, 1953
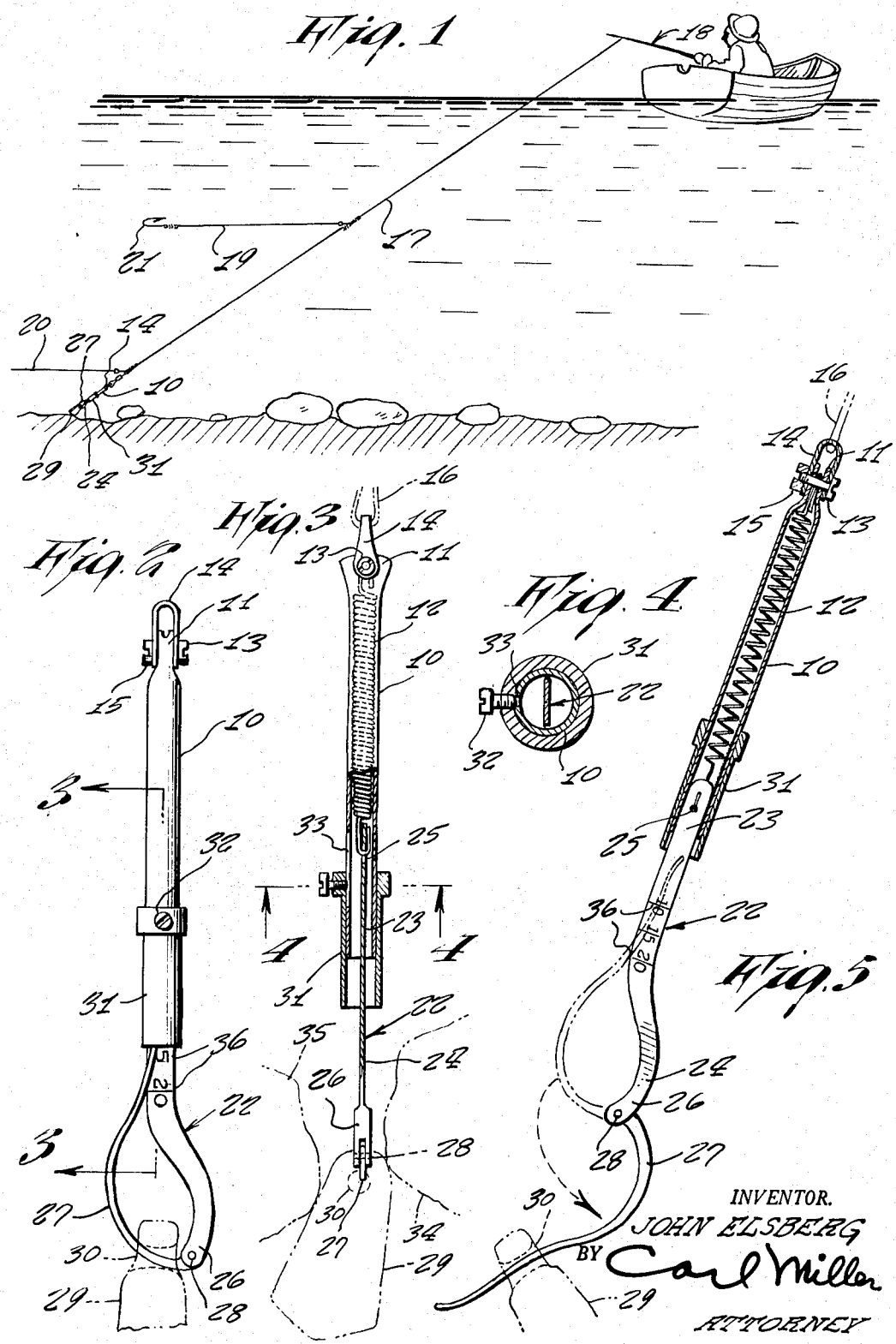
INVENTOR.
JOHN ELSBERG
BY Carl Miller
ATTORNEY United States Patent Office 2,733,537
Patented Feb. 7, 1956

2,733,537
SINKER RELEASER FOR FISHING LINES

John Elsberg, New York, N. Y.

Application July 6, 1953, Serial No. 366,334

1 Claim. (Cl. 43—43.12)

This invention relates to fishing lines and more particularly to a sinker releaser therefor.

It is an object of the present invention to provide a sinker releaser for fishing lines which will automatically release a sinker caught or jammed in rocks on the ocean or river bed when the tension in the fishing lines reaches a maximum point.

It is another object of the present invention to provide a sinker releaser for fishing lines of the above type which may also be used for testing the strength of the fishing line.

Other objects of the present invention are to provide a sinker releaser for fishing lines bearing the above objects in mind which is of simple construction, inexpensive to manufacture, has a minimum number of parts, easy to use and efficient in operation.

For other objects and a better understanding of the invention, reference may be had to the following detailed description taken in connection with the accompanying drawing in which:

Figure 1 is a perspective view showing a sinker releaser for fishing lines embodying the features of the present invention in operative use;

Fig. 2 is a side elevational view of the device in a closed position;

Fig. 3 is a longitudinal sectional view taken along the line 3—3 of Fig. 2;

Fig. 4 is a transverse sectional view taken along the line 4—4 of Fig. 3; and

Fig. 5 is a perspective view of the device in a releasing position, shown partly in section.

Referring now to the figures, 10 represents an elongated hollow cylindrical member open at both ends, one end thereof being stamped flat, as at 11. A tension spring 12 is disposed within the member 10 with the upper end thereof disposed within the flattened portion 11. The flattened portion 11 is provided with transversely aligned openings through which passes a screw 13 around which the upper end of spring 12 is looped. A yoke 14 is provided at its ends aligned with the openings in the flattened portion 11 with similar openings receiving the screw 13, the latter being retained in the operative position by means of a nut 15. Thus, the device is connected to the fishing line by means of the end of line 16 engaging the yoke 14 (Fig. 3).

The fishing line 17 is connected in the usual manner with the fishing rod and reel 18, the line 17 being provided with the auxiliary lines 19 and 20 carrying the fishhooks 21.

A flat elongated member 22 having a straight portion 23 adapted to slide into the open end of the member 10 and a curved portion 24 is provided at the upper end of the straight portion 23 with an opening 25 which receives the lower end of the spring 12. The end of the curved portion 24 is bifurcated as at 26 and rotatably mounts a hook shaped member 27 by means of a pin 28, the member 27 being adapted to be rotated with the end thereof in overlapping relation with the straight portion 23 (Fig. 2). The free end of the hook shaped member 27 will be drawn upwardly within the member 10 by the spring 12, providing a closed portion of loop shape on which a sinker 29 is mounted by means of an opening 30. Thus, in order to release the sinker it will be necessary to exert a minimum force on the spring 12, this force being less than that required to break the line 17.

As a means of increasing the tension of spring 12 necessary to release the member 27 and thereby the sinker 29, a sleeve 31 is slidably mounted at the end of the member 10 in a plurality of adjustable positions by means of a set screw 32 which engages a slot 33 provided in the member 10. Thus, by increasing the combined lengths of the member 10 and sleeve 31, it will be necessary to expand the spring 12 a correspondingly greater amount before releasing the member 27 and thereby the sinker. The set screw 32 also permits the collar 31 to be adjusted to accommodate sinkers 29 of varying weights.

In operation, when the sinker 29 becomes caught or jammed between the rocks 34 and 35 (Fig. 3), the sinker will be released before the tension in line 17 becomes sufficiently great to snap the line. When the sinker is caught or jammed in the rocks, a pull on the line and a quick release will frequently dislodge the sinker due to the action of the spring 12.

By providing the face of the member 22 with markings 36, the device may also be used to test the strength of fishing lines in an obvious manner, the markings 36 being read in connection with the end of sleeve 31.

While various changes may be made in the detail construction, it shall be understood that such changes shall be within the spirit and scope of the present invention as defined by the appended claim.

Having thus set forth and disclosed the nature of my invention, what is claimed is:

A sinker releaser for fishing lines comprising an elongated hollow member having one end portion flattened, a tension spring within said hollow member and having one end secured within said flattened end portion, means for securing said flattened end portion to a fishing line, a flat member having a straight portion adapted to slide within the other end of said hollow member and connected to the other end of said spring, said flat member being integrally formed at its outer end with a curved portion pivotally connected to an oppositely curved member having a straight portion adapted to overlap the straight portion of said flat member and to slide within said hollow member whereby to provide a closed loop adapted to receive a sinker, a sleeve provided at the unflattened end of said hollow member and extending beyond the unflattened end thereof, and set screw means for locking said sleeve to said hollow member in a plurality of adjustable positions whereby to vary the tension of said spring necessary to release the straight portion of said oppositely curved member from said hollow member, said flat member being provided with markings adapted to be read in connection with the end of said sleeve to indicate the tension in the fishing line.

References Cited in the file of this patent

UNITED STATES PATENTS

| | | |
|---|---|---|
| 703,713 | Smith et al. | July 1, 1902 |
| 1,518,205 | Kountz | Dec. 9, 1924 |
| 2,627,692 | Goodman | Feb. 10, 1953 |
| 2,655,367 | Andersen | Oct. 13, 1953 |

FOREIGN PATENTS

| | | |
|---|---|---|
| 393,212 | Great Britain | 1933 |
| 507,027 | France | 1920 |